United States Patent [19]

Kirschmann

[11] 4,218,317
[45] Aug. 19, 1980

[54] REVERSE OSMOSIS WATER PURIFIER

[76] Inventor: John D. Kirschmann, 933 Anderson St., Bismarck, N. Dak. 58501

[21] Appl. No.: 957,407

[22] Filed: Nov. 2, 1978

[51] Int. Cl.² .............................................. B01D 23/20
[52] U.S. Cl. .................................. 210/117; 210/133; 210/137; 210/321 R; 210/259; 210/416 DW; 210/416 M; 210/449; 210/473
[58] Field of Search ................ 138/40, 45, 46; 251/7, 251/117; 210/117, 133, 136, 137, 308, 321 R, 409, 416 M, 416 DW, 433 M, 449, 473, 494 M; 239/570

[56] References Cited

U.S. PATENT DOCUMENTS

| | | | |
|---|---|---|---|
| 2,950,608 | 8/1960 | Abbott | 138/40 X |
| 3,504,796 | 4/1970 | Bray | 210/137 |
| 3,841,567 | 10/1974 | Droyek et al. | 239/570 |

Primary Examiner—Thomas G. Wyse
Assistant Examiner—Ferris H. Lander
Attorney, Agent, or Firm—Williamson, Bains, Moore & Hansen

[57] ABSTRACT

A reverse osmosis water purifying device is provided with a flush water restrictor which serves to provide a suitable back pressure on the reverse osmosis membrane in order to affect the purification process. The device is designed for attachment to any source of pressurized water. The restrictor device consists of a capillary tube sized to provide a suitable ratio of flush water to purified water. A ball-type check valve surrounds the capillary tube at its point of exit and the ball valve may be dislodged in order to flush the membrane. The core of the membrane assembly is filled with activated charcoal in order to provide for a more efficient and complete purification.

9 Claims, 8 Drawing Figures

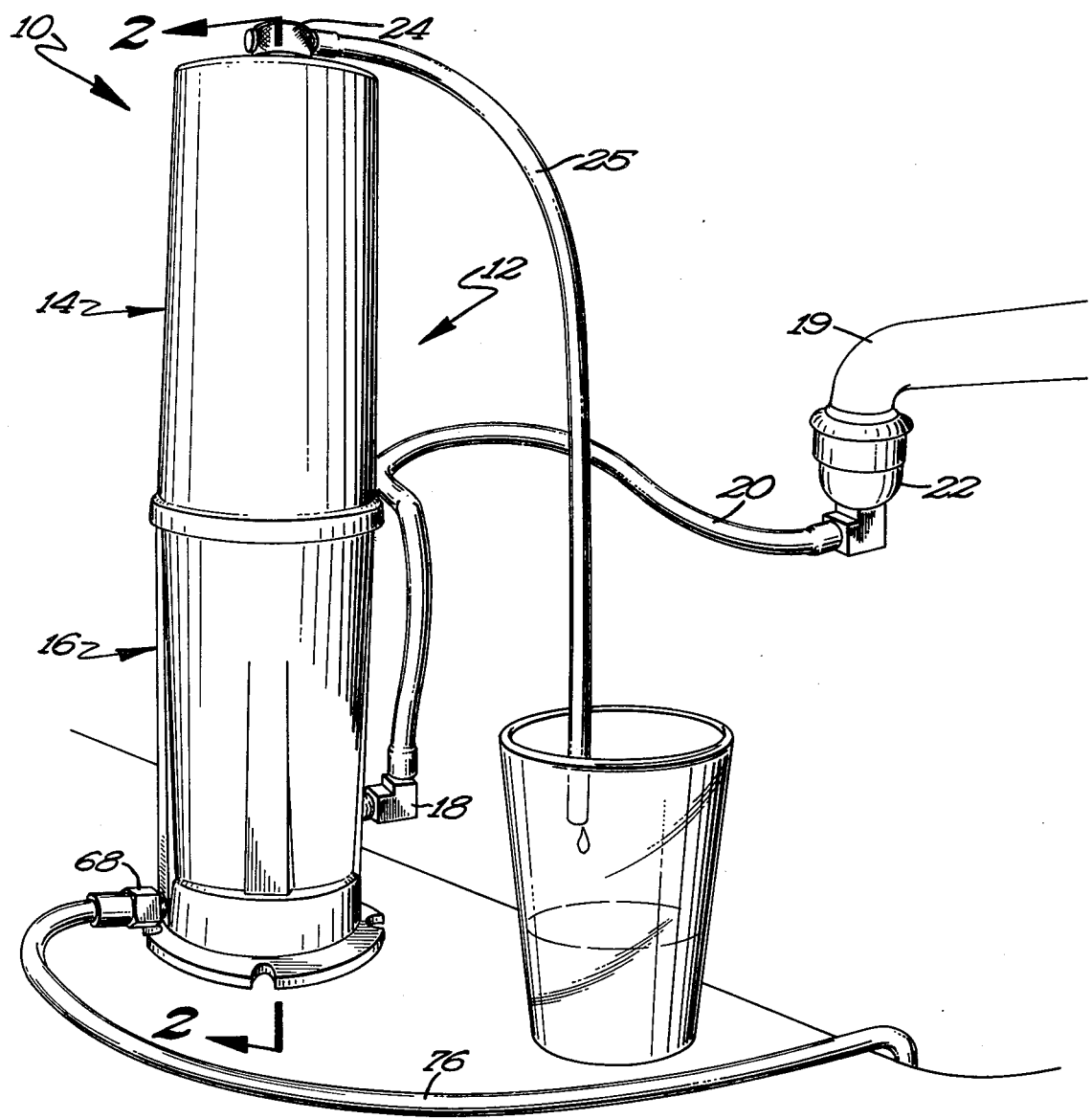
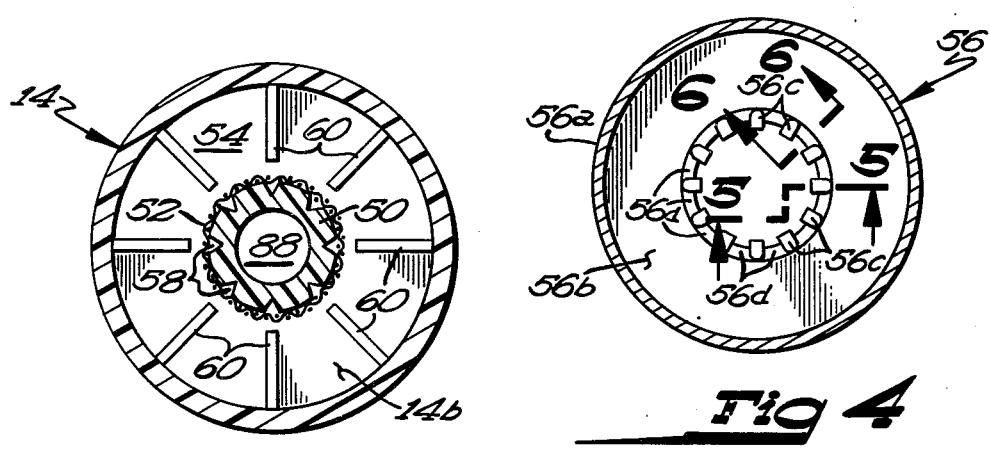

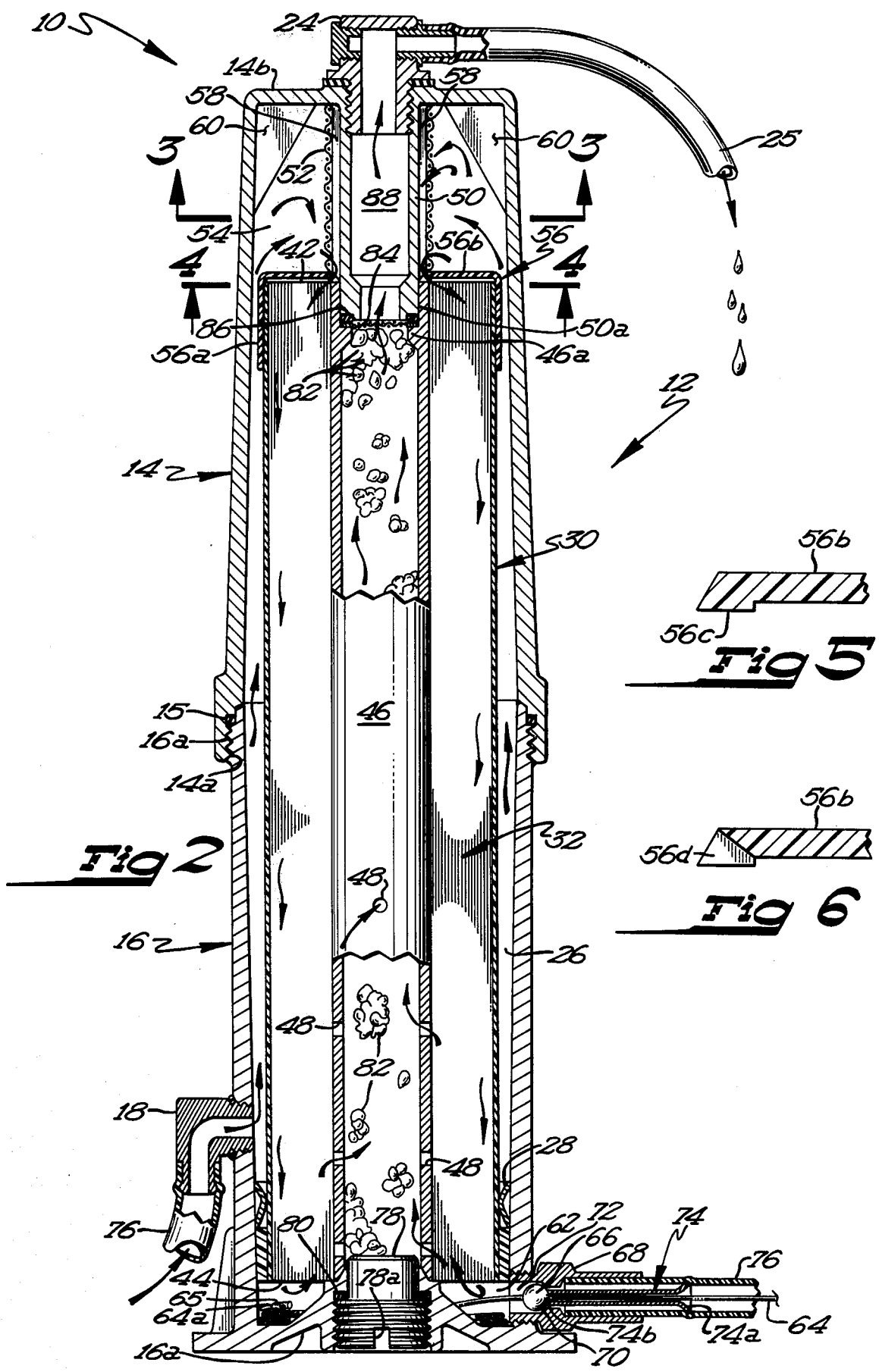

REVERSE OSMOSIS WATER PURIFIER

BACKGROUND OF THE INVENTION

With the national trend toward the use of natural food products and the like in recent years, many people have increasingly sought alternatives to the tap water generally available. Such alternatives consist of either buying mineral, spring or distilled water or in the alternative to purify one's tap water to a more satisfactory level. Of the home purification devices presently available, most fall into one of two categories. First, many home distilling units are available, and while these are capable of a high degree of purification, they suffer from the drawback that energy is required to run them which consequently adds to the cost of the water in addition to the fairly high initial cost of such units. The second category of purifiers are generally those of the activated charcoal type which, although inexpensive and fairly efficient, do not remove enough impurities to provide truly healthful water.

Various reverse osmosis water purifiers have been proposed and built in the past, the principle being well-known. Such prior devices are typified by U.S. Pat. No. 3,695,446. Such devices tend to be fairly bulky and, in addition, have been suited mainly for commercial use in that they have not presented a construction which a consumer could easily disassemble and reassemble or which is suitably compact for home use. The prior art devices also do not provide an apparatus which is easily operated by the consumer and which may be easily cleaned or flushed in order to extend the life of the reverse osmosis membrane. Also the prior art devices have tended to be bulky and expensive and aimed mainly at the commercial market.

It is therefore an object of this invention to provide a reverse osmosis purifying device which may be manufactured inexpensively and used by the consumer in his or her home with a minimum of maintenance, expense and difficulty. It is further an object of this invention to provide a device which may be easily flushed in order to clear out residue build up from the reverse osmosis membrane and which may be easily adjusted to match the prevailing water condition in the area of where it is being used.

SUMMARY OF THE INVENTION

A cylindrical housing is provided which contains a spirally wound reverse osmosis membrane cartridge. The purified water spirals into the center of the cartridge while the feed and flush water runs axially between the layers of the cartridge. In order to properly utilize the reverse osmosis membrane, a substantial pressure must be placed on the feed water which is generally equal to the pressure of the water coming out of the tap. In order to do so, a back pressure must be created at the flush water outlet by means of a restrictor. The restrictor is formed by utilizing a capillary tube of substantial length and sufficient to restrict the flow and provide the suitable back pressure for operation of the reverse osmosis membrane. The capillary tube is coiled in the bottom of the housing. The core of the reverse osmosis membrane is filled with activated charcoal which serves to further purify the water before it is passed out at the device. A plug is provided at the bottom end of the housing for draining and recharging the charcoal in the center. The capillary tube of the restrictor passes through a small rubber ball check valve wherein the ball is normally held against its set by the tap water pressure. When it is desired to flush the device the check ball is dislodged from its seat by means of a small tube manipulable from outside the device in order to push the ball away from the seat and allow water to flush freely through the device thereby carrying away the salt and other residue build up from the reverse osmosis membrane surface thereby prolonging unit life as well as producing better results. The flush valve also can be used to release pressure in the unit when it is wished to disconnect the unit from the faucet or other source of pressurized water thereby preventing splashing of the user.

These and other objects and advantages of this invention will more fully appear from the foregoing description made in connection with the accompanying drawings, wherein like reference characters refer to the same or similar parts throughout the several views.

DESCRIPTION OF THE DRAWING FIGURES

FIG. 1 is a perspective view of the water purifier as connected to a faucet.

FIG. 2 is a sectional view taken along lines 2—2 of FIG. 1.

FIG. 3 is a sectional view taken along lines 3—3 of FIG. 2.

FIG. 4 is a sectional view taken along lines 4—4 of FIG. 2.

FIG. 5 is a sectional view taken along lines 5—5 of FIG. 4.

FIG. 6 is a sectional view taken along line 6—6 of FIG. 4.

DESCRIPTION OF THE PREFERRED EMBODIMENT

Figure 7:
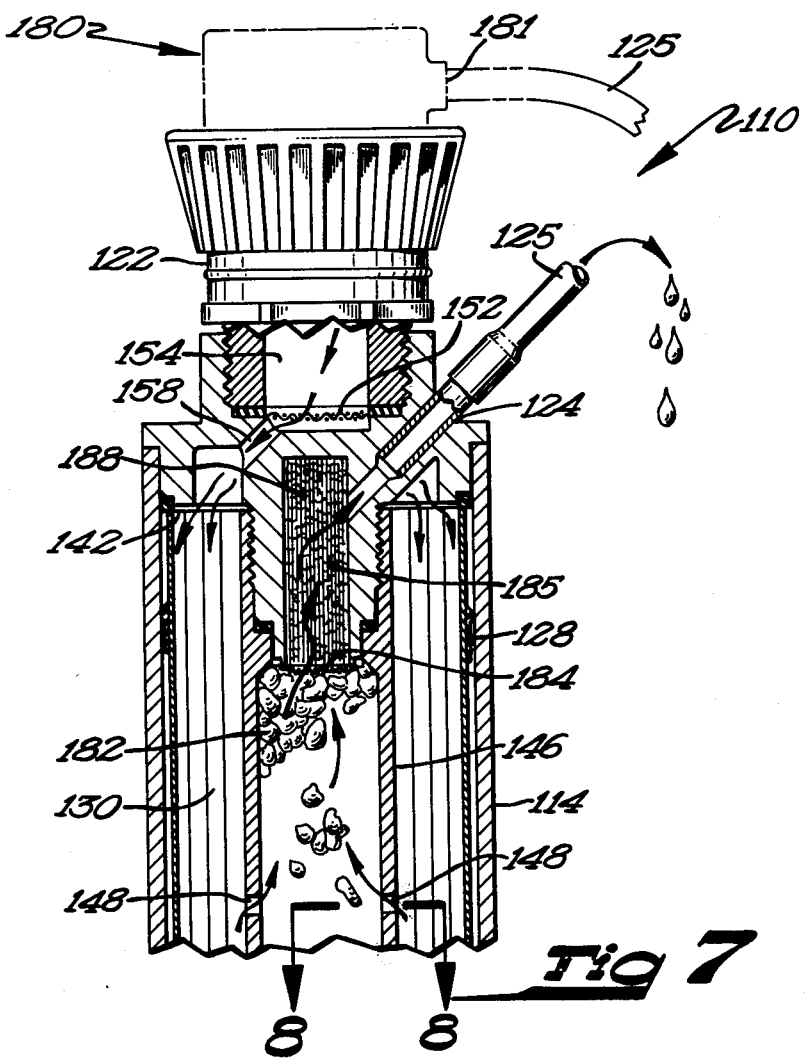
FIG. 7 is a sectional view similar to FIG. 2 showing an alternative embodiment for direct snap-on connection to a faucet.

Referring now to FIG. 1, the reverse osmosis purifying device generally referred to as 10 is comprised of a generally cylindrical housing 12 having an upper half 14 and lower half 16. The inlet fitting 18 of the device 10 is connected via inlet hose 20 to faucet 19 by means of a conventional snap-on faucet connector 22. An outlet fitting 24 allows finished, purified water to flow through outlet tube 25 into any storage container desired. Flush water outlet fitting 68 is connected by means of hose 76 to a drainage source which can be a conventional sink drain.

Referring now to FIG. 2, upper housing 14 consists of a generally cylindrical portion having at one end threaded connector 14a for connection to the bottom cylindrical section 26 at bottom threaded portion 16a. An o-ring 15 is located therebetween in order to assist in sealing between the two halves. Upper end wall 14b has depending therefrom outlet locating tube 50 and an outlet passage 88 located therein. At the bottom end 50a of outlet tube 50 a screen 84 prevents charcoal and the like from passing into the outlet as will be more fully described hereinafter. A membrane assembly generally 30 takes the form of a cylinder having a hollow core 46. Inlet fitting 18 is threaded into the side of lower housing 16 and there is provided between the outside of core assembly 30 and housing 12 an inlet flow passage 26 which runs about the circumference between housing 12 and membrane assembly 30. A seal 28 is located towards the lower end of the membrane assembly 30 and serves to prevent the inlet water from traveling downwardly past that point. An upper retaining cup 56 retains the upper end of membrane assembly 30 in relation to housing 12.

The membrane assembly 30 consists of a spirally wound membrane laminate 32 comprised of two layers of reverse osmosis membrane 32a and 32c sandwiching a felt-like material 32b. Such membrane assemblies are well-known in the art and can be formed of acetate or other materials. When water under pressure is placed against the sides of the membrane sandwich, due to the pressure differential caused by the water in felt material 32b being under no appreciable pressure, pure water will migrate through the membrane layers 32a and 32c into the felt spacer 32b where it will spiral inwardly as shown by the arrows to a pure water exit 40 adjacent core 46. Core 46 has a number of apertures 48 which allow the pure water to flow inwardly therethrough. While the pure water flows in a spiral fashion around the spirally wound membrane, the feed water which becomes the flush water as it passes downwardly through the assembly flows axially through the device as shown in FIG. 2. The layers of membrane laminate 32 are kept apart by a screen-like member 34 which allows the feed water to flow between the layers of membrane laminate under pressure. One layer of the membrane sandwich is sealed to an adjacent layer by an outer seal 38 in order to prevent intermixture of the purified and flush and feed water and similarly inner seal 36 performs the same function at the inner end. The outer circumference of membrane assembly 30 is coated so as to prevent any permeability other than through the ends, those being namely feed water inlet 42 and flush water outlet 44.

Retaining end cup 56 encircles and locates the upper end of membrane assembly 30. Cup 56 is comprised of cylindrical surface 56a depending from circular portion 56b. Water flows through inlet passage 26 into inlet chamber 54 at the upper end of the device. This chamber is stiffened by means of triangular ribs 60 shown in FIGS. 2 and 3. Cylindrical member 50 has a plurality of axially extending notches 58 and inlet screen 52 is wrapped about member 50 in order to screen the incoming fluid from particles and the like. Notches 58 communicate with notches 56d of cup 56 which are separated by ribs 56c as shown particularly in FIGS. 4, 5 and 6 in order to provide communication with the inlet end 42 of membrane assembly 30. The lower end of membrane assembly 30 abuts against bottom wall 16a which has formed therein a toroidal shaped flush and outlet cavity 62. Outlet cavity 62 has coiled therein capillary tube 64 having a free end 64a with screen 65 located thereover. Capillary tube 64 is coiled in cavity 62, passes through outlet check ball 66 and into outlet tube 76. Check ball 66 is a small rubber ball valve having a passage through which capillary tube 64 passes. Check ball 66 is located in cylindrical check ball passage 72 in outlet fitting 68. A conical check valve set 70 provides a surface against which check ball 66 rests when under pressure to prevent flow thereabouts except through capillary tube 64. A flush actuator 74 consists of a small piece of tubing through which capillary tube 64 passes and which is flared at end 74a to provide a means by which an operator may easily grip flush actuator 74 and press inwardly whereupon inner end 74b of flush actuator 74 dislodges check valve ball 66 from check valve seat 70 and allows the device to flush in a relatively unimpeded fashion out outlet tube 76.

A threaded plug 78 is threadably located in bottom wall 16 of housing 12 and has a slot 78a therein for engagement with screwdriver, coil or the like in order to facilitate removal. Plug 78 seals against o-ring 80 so that plug 78 provides access to the inside of core 46 which is filled with activated charcoal 82 which acts as a further filtering agent. Plug 78 allows the charcoal to be removed and recharged without extensive disassembly of the remainder of the device as such removal and replacement is periodically required in order to insure proper performance. Screen 84 is sandwiched between the upper ledge 46a of core 46, sealing o-ring 86 and the bottom end 50a of cylindrical member 50 in order to retain the charcoal in the core area.

FIG. 7 discloses an alternative embodiment of the inventive device wherein provision is made for direct snap-on engagement of device 110 to a faucet (not shown) by means of snap-on fitting 122. While device 110 is somewhat smaller than the previously described embodiment, such smaller sizes are required in order for the device to be accommodated within various household sinks. Thus water incoming through passage 154 communicates through passage 158 with the upper end 142 of cartridge assembly 130. The lower end of the device is substantially similar to that shown in FIG. 2 including the flushing mechanism. Cotton filter material 185 is located in the outlet passage 188 which assists in locating and retaining the charcoal in the core chamber as described above. Water exits outlet chamber 188 by means of outlet tube 124 as shown in FIG. 7.

Due to the nature of the membrane, once it has been wetted, it must remain wet (between uses) in order to remain effective. To keep the membrane wet one may place a simple cap or plug over the outlet hose 76. The other two ports of the device may be sealed by means of a plug 180 shown in phantom in FIG. 7 and which fits into snap-on fitting 122. Plug 180 has an aperture 181 therein for reception of pure water outlet hose 125. Of course the same plug construction may be used with the embodiment of FIGS. 1–6.

Figure 8:
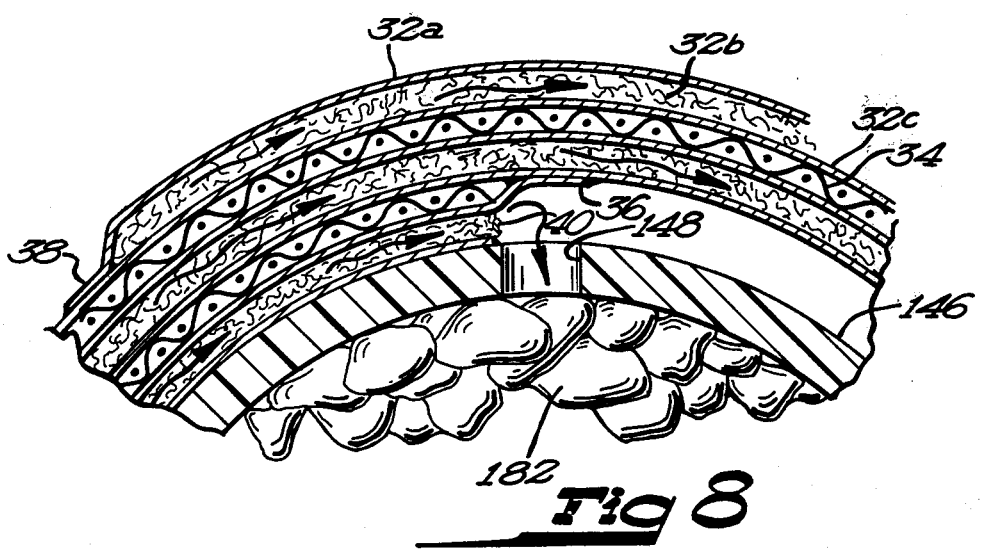
FIG. 8 is a sectional view taken along lines 8—8 of FIG. 7 showing a section of the reverse osmosis membrane and core.

In operation, the device is hooked to a water faucet, the water travels inwardly through inlet tube 20, inlet fitting 18, and thence into inlet passage 26 surrounding membrane assembly 30 whereupon it travels upwardly into inlet cavity 54. There, after passing through inlet screen 52 (ideally about 50 mesh) the water passes downwardly through notches 58 and slots 56d in cup 56 and into the inlet end 42 of membrane assembly 30. The tap water which is typically at a pressure of anywhere from 30–125 psi causes pure water to force its way through the membrane and into the membrane 32a and 32c and into the felt area 32b whereupon it spirals its way into the center as shown in FIG. 8. Thence, the pure water passes through apertures 48 and core 46 whereupon it passes through activated charcoal 82 which removes the final traces of chlorine, organics, chloroform and the like. The purified water then passes through outlet filter screen 84 and thence through outlet passage 188 and outlet tube 25. On the other hand, the feed and flush water travels downwardly as shown in FIG. 2 through the screen member 34 located between the membrane laminate layers until it enters outlet cavity 62. In order to maintain a suitably high pressure on the reverse osmosis membrane, a restriction is needed in the outlet so that the proper pressure can be exerted on the membrane. In the instant invention, a capillary tube serves this function and is easily adjustable to fit varying water types and conditions. Typically, the capillary tube is formed of 0.020 inch ID tubing which is coiled about the outlet cavity 62. The length of the capillary tube 64 then determines the rate at which water will flush through the device. If one starts with relatively clean water having, for instance, 300 ppm dissolved solids, then one would provide a capillary tube length of approximately four to five feet. Since this water is relatively clean, there is no need to flush a lot of water through the system in order to keep the membrane surface clear. Thence, with the relatively pure water to begin with and the large amount of restriction, the device will yield approximately one gallon of pure water for every two gallons of flush water passing through the system. On the other hand, should one start with a water that contains more contamination of say 3,000 ppm dissolved solids, one would cut the capillary tube to have a length of approximately one foot thereby providing less restriction and yielding approximately eight gallons of flush water for every gallon of pure water produced. With such relatively impure feed water, it is desirable to provide a certain amount of natural flushing action by lowering the restriction. In any case, whether with relatively pure water or relatively impure water, it is desirable to periodically provide a flushing action much greater than that provided in the normal operation of the device in order to pass a large amount of water over the surface of the membrane in order to clean off salts and the like which may become deposited there. In order to do so, all a user need do is press on the flared end 74a of flush actuator 74 then press inwardly thereby pressing end 74b against check ball 66 and moving it away from conical check seat 70 thus allowing a much larger amount of water to flow out of the system than would normally be allowed by the capillary tube. This flushing system is also useful in that even if the faucet to which the unit is attached is shut off, the unit will retan a high amount of internal pressure. In order to bleed off this pressure so the unit may be removed from the faucet without splattering, all one need do is actuate the flush mechanism as described above.

While the preferred embodiments of the present invention have been described, it should be understood that various changes, adaptations and modifications may be made therein without departing from the spirit of the invention and the scope of the appended claims.

What is claimed is:

1. A water purification device utilizing a reverse osmosis membrane assembly; the device having an inlet for connection to a source of pressurized feed water to be purified and an outlet for flush water, and whereby said reverse osmosis membrane assembly requires water pressure in a predetermined range for proper operation wherein the improvement comprises an outlet restrictor for regulating and restricting the flow of flush water from said device, said restrictor comprising:
   a piece of capillary tubing, said piece being of a length and internal diameter sufficient to restrict the flow of flush water so as to maintain the water pressure in said predetermined range;
   a ball check valve comprising a ball and corresponding seat arranged so that flow of water from said device will tend to force said valve closed wherein said capillary tubing passes through said ball and is sealed thereto such that when said device is pressurized during operation, said ball is forced against said seat so that all flush water exits through said capillary tube thereby maintaining said predetermined pressure range; and
   means for opening said check valve for flushing said device of impurities.

2. The water purification device of claim 1 wherein said opening means comprises a sleeve having first and second ends, said sleeve located slidably over said capillary tube, said sleeve first end being adjacent the said check ball so that when said sleeve second end is pushed toward said first end, said ball is forced away from said seat.

3. The water purification device of claim 1 wherein said membrane assembly is cylindrical and has first and second ends and a hollow core, said first end having an inlet for feed water, said second end having an outlet for flush water, said core having an outlet for pure water, said device further comprising a cylindrical housing having a top and a bottom, said housing containing said assembly, said housing having an outlet cavity adjacent said assembly second end, said cavity containing said capillary tube.

4. The water purification device of claim 3 further comprising means for detachably connecting said device to a source of pressurized water.

5. The water purification device of claim 4 wherein said connecting means is rigidly attached to the top of said housing whereby said device may be attached to a faucet and flush water may be drained directly into a sink thereunder.

6. The water purification device of claim 3 wherein said capillary tube is coiled in said cavity.

7. The water purification device of claim 3 wherein said core is filled with activated charcoal.

8. The water purification device of claim 7 further comprising a cylindrical member sealingly extending from the bottom of said housing through said cavity to the bottom of said membrane assembly adjacent said core thereby isolating said core from said cavity.

9. The water purification device of claim 8 further comprising a removable plug located in said housing bottom, said plug being located within the area of said housing bottom circumscribed by said cylindrical member.

* * * * *

UNITED STATES PATENT AND TRADEMARK OFFICE
CERTIFICATE OF CORRECTION

PATENT NO. : 4,218,317
DATED : August 19, 1980
INVENTOR(S) : John D. Kirschmann

It is certified that error appears in the above-identified patent and that said Letters Patent are hereby corrected as shown below:

Column 2, line 1, delete "set", insert --seat--.

Column 2, line 57, delete "26", insert --16--.

Column 3, line 61, delete "set", insert --seat--.

Column 5, line 40, delete "retaii", insert --retain--.

Signed and Sealed this

Twentieth Day of January 1981

[SEAL]

Attest:

Attesting Officer

RENE D. TEGTMEYER

Acting Commissioner of Patents and Trademarks